(12) United States Patent
Hirose

(10) Patent No.: US 6,883,680 B2
(45) Date of Patent: Apr. 26, 2005

(54) LID OPENING DEVICE

(75) Inventor: Akihiko Hirose, Zama (JP)

(73) Assignee: Nifco, Inc., Yokohama (JP)

( * ) Notice: Subject to any disclaimer, the term of this patent is extended or adjusted under 35 U.S.C. 154(b) by 9 days.

(21) Appl. No.: 10/330,147

(22) Filed: Dec. 30, 2002

(65) Prior Publication Data

US 2003/0132234 A1 Jul. 17, 2003

(30) Foreign Application Priority Data

Jan. 16, 2002 (JP) ........................................ 2002-007588

(51) Int. Cl.[7] .............................................. B65D 43/14
(52) U.S. Cl. ...................... 220/830; 220/835; 220/264; 224/275; 296/37.12; 248/311.2
(58) Field of Search ........................ 248/311.2; 16/285, 16/289, 290, 292, 306, 307, 342, 334, 336, 324; 220/830–832, 835, 263–264; 224/275; 49/379, 386, 192; 296/37.12, 37.8

(56) References Cited

U.S. PATENT DOCUMENTS

| | | | | |
|---|---|---|---|---|
| 4,470,220 A | * | 9/1984 | Sudo ........................... | 49/379 |
| 5,388,901 A | * | 2/1995 | Asano ........................ | 312/222 |
| 5,520,313 A | * | 5/1996 | Toshihide .................... | 224/539 |
| 5,620,122 A | * | 4/1997 | Tanaka ....................... | 224/275 |
| 5,718,405 A | * | 2/1998 | Adachi ..................... | 248/311.2 |
| 5,893,478 A | * | 4/1999 | Maruoka ..................... | 16/354 |
| 6,470,627 B2 | * | 10/2002 | Fukuo .......................... | 49/260 |
| 6,609,631 B2 | * | 8/2003 | Asami ........................ | 220/817 |
| 2003/0173369 A1 | * | 9/2003 | Nikolaus et al. ............ | 220/830 |
| 2004/0034967 A1 | * | 2/2004 | Hsiu ........................... | 16/342 |

* cited by examiner

Primary Examiner—Lee Young
Assistant Examiner—James Smalley
(74) Attorney, Agent, or Firm—Manabu Kanesaka

(57) ABSTRACT

A lid opening device includes a lid body having a pivotal support part on one end thereof pivotally supported on a main body for opening and closing a part of the main body; an engaging member provided on a perimeter around the pivotal supporting part on the lid body; a spring device for urging the engaging member toward a direction in which the lid body opens from the completely closed position; a locking device for holding the lid body in the completely closed position against a springing force of the spring forcing device; and an engaging range restricting device for restricting a range of engagement between the spring forcing device and the engaging member. The lid body urged by the springing force opens at a specific initial opening position.

9 Claims, 7 Drawing Sheets

LID OPENING DEVICE

BACKGROUND OF THE INVENTION AND RELATED ART STATEMENT

The present invention relates to a lid opening device. In a small article compartment with a lid, for example, provided inside an automobile, the lid is opened and closed when placing and removing a small article. Accordingly, in such a small article compartment, a locking mechanism for locking the lid in a completely closed position is provided so that the lid in the completely closed state does not open due to vibrations while the car is running, and the like. In addition, it is preferable that the lid is stopped in a half-open position so that the lid does not move due to vibrations while running, and the like, when placing and removing a small article.

FIG. 7 shows a conventional example of the small article compartment with a lid for automobile, in which the lid can be stopped in a half-opening position. In the compartment shown in the figure, a compartment main body 21 is fixed to the vehicle body (not shown), and a recessed part 21a opened upward is provided on the compartment main body 21. A lid body 22 for covering an opening of the recessed part 21a is attached to the compartment main body 21 so that the lid body can tilt freely.

A coil spring 23 for urging the lid body 22 toward an opening direction is provided between the compartment main body 21 and the lid body 22. Also, a latch 24a having an engaging hook that constitutes a locking mechanism for holding the lid body 22 in the completely closed state is provided on a side of the compartment main body 21. A corresponding engaging convex 24b is provided on the lid body 22.

An arc-shaped arm 25 is supported on the lid body 22 in a suspended state, and a pair of engaging hooks 25b protruding in the width direction is provided on a lower ends 25a of that arc-shaped arm 25. Engaging holes 21b, in which the above lower ends 25a are inserted so that the lower ends appear and disappear freely, are provided on the compartment main body 21. The engaging hooks 25b engage the engaging holes 21b at an inside of the compartment main body 21 for controlling a degree of opening of the lid body 22. With this configuration, the lid body 22 is held in a half-opening state. Thus, it is not necessary to hold the lid body 22 in the opening state when placing and removing a small article, and the small article compartment with the lid is convenient to use.

However, in the above conventional example, the arc-shaped arm 25 is exposed as shown in FIG. 7 in the half-opening state of the lid 22. Accordingly, when attempting to place and remove a small article on a side of the arc-shaped arm 25, the arc-shaped arm 25 becomes an obstacle, thereby impairing convenience of use, and in addition, an appearance also is bad.

Therefore, it is an object of the present invention to improve convenience and an appearance of a small article compartment with a lid.

Further objects and advantages of the invention will be apparent from the following description of the invention.

SUMMARY OF THE INVENTION

In order to solve such problems, the present invention provides a lid opening device. The lid opening device includes a lid body having a pivotal support part on one end thereof pivotally supported on a main body for opening and closing a part of the main body; an engaging member provided on a perimeter around an axis of the pivotal supporting part on the lid body; spring forcing means for urging the engaging member toward a direction in which the lid body opens from the completely closed position; locking means for holding the lid body in the completely closed position against a spring force of the spring forcing means; and engaging range restricting means for restricting a range of engagement between the spring forcing means and the engaging member so that the lid body urged by the spring force opens at a specific initial opening position.

With this configuration, the initial opening of the lid body can be restricted through the engagement between the engaging member and the spring forcing means. Since the engaging member is provided on the perimeter around the axis of the pivotal support part, a mechanism for restricting the initial opening of the lid body can be provided in the vicinity of the pivotal support part. Also, because there is no obstacle between the main body and the lid body when the lid opens, it is easy to place and remove a small object, and the like, and the appearance also is improved.

Further, the spring forcing means has spring means supported on the main body, and a swivel arm provided on the main body to swivel freely between the spring means and the engaging member. One end of the swivel arm engages the engaging member, and the spring means urges the swivel arm toward a direction of the engagement. Accordingly, with a simple mechanism in which the engaging range of the swivel arm is restricted, the range of the initial opening can be restricted, and the apparatus can be made inexpensive.

Also, spring engaging means is provided between the lid body and the main body for elastically engaging in a position at which the lid body is opened at the initial opening position. Thus, the lid body can be held at a specified opening position exceeding the initial opening position. The lid body can be opened at a specific opening position with a clicking feeling and can be held at a specific position, thereby improving the convenience of use.

Also, the spring engaging means has a concave or convex part provided on an inner perimeter surface of a ring-shaped part provided coaxially with the axis of the pivotal supporting part on the lid body, and a spring engaging piece fixed to the main body for elastically engaging the concave or convex part in a state in which it is received inside said ring-shaped part. Because the concave or convex part is provided on the inner perimeter surface of the ring-shaped part such that the lid can be held at a specific opening position, and the position can be set arbitrarily or in multiple stages, an opening according to the convenience of use can be set easily.

DETAILED DESCRIPTION OF PREFERRED EMBODIMENTS

Hereunder, embodiments of the present invention will be explained in detail with reference to the accompanying drawings.

Figure 1:
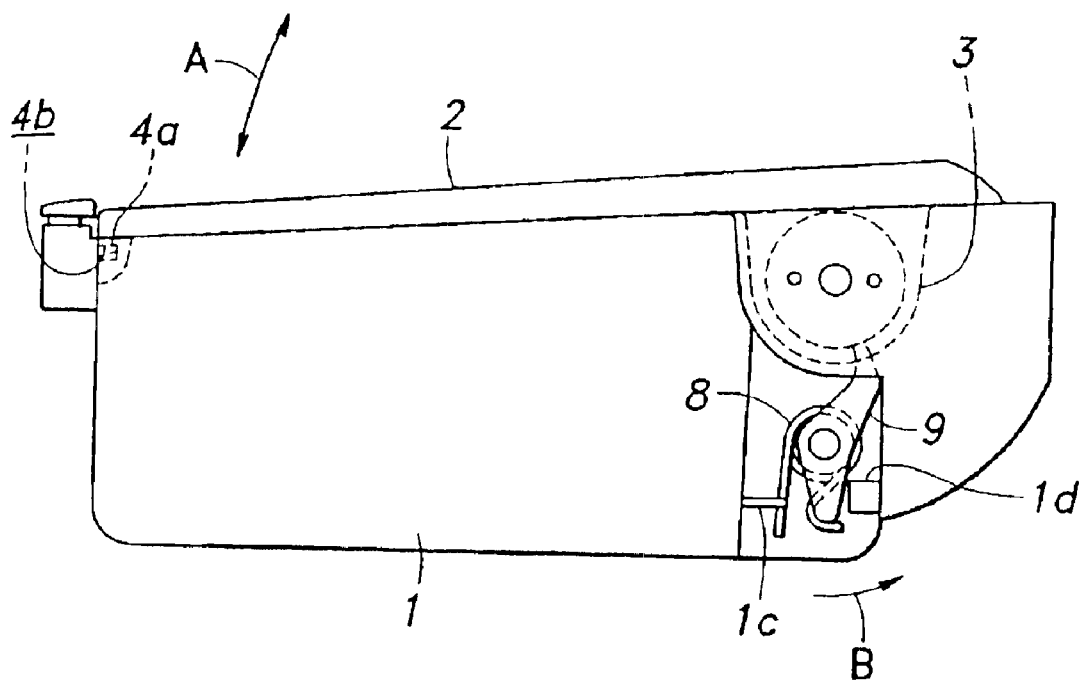
FIG. 1 is a side view of a small article compartment with a lid for an automobile according to the present invention.

FIG. 1 is a side view of a small article compartment with a lid to which the present invention is applied. This small compartment comprises a box-shaped main body 1 to be fitted to a center console of an automobile (not shown) and a lid body 2 for opening and closing an upper face of the main body 1. These main body 1 and lid body 2 may have the same external appearance as those shown in the conventional example.

A pair of protruding pieces 3 as a pivotal support part is provided at left and right sides in a longitudinal direction (front and back directions in FIG. 1) on a backside of one end of the lid body 2. The lid body 2 is pivotally supported on the main body 1 via the protruding pieces 3 to tilt freely as shown by an arrow A in the drawing. On the other end of the lid body 2 in the longitudinal direction, a latch 4a having an engaging hook as locking means for holding the lid body 2 in the completely closed state is provided on a side of the main body 1, and a corresponding engaging convex portion 4b is provided on the lid body 2. These latch 4a and engaging convex portion 4b may be the same as those in the conventional example.

Figure 2:
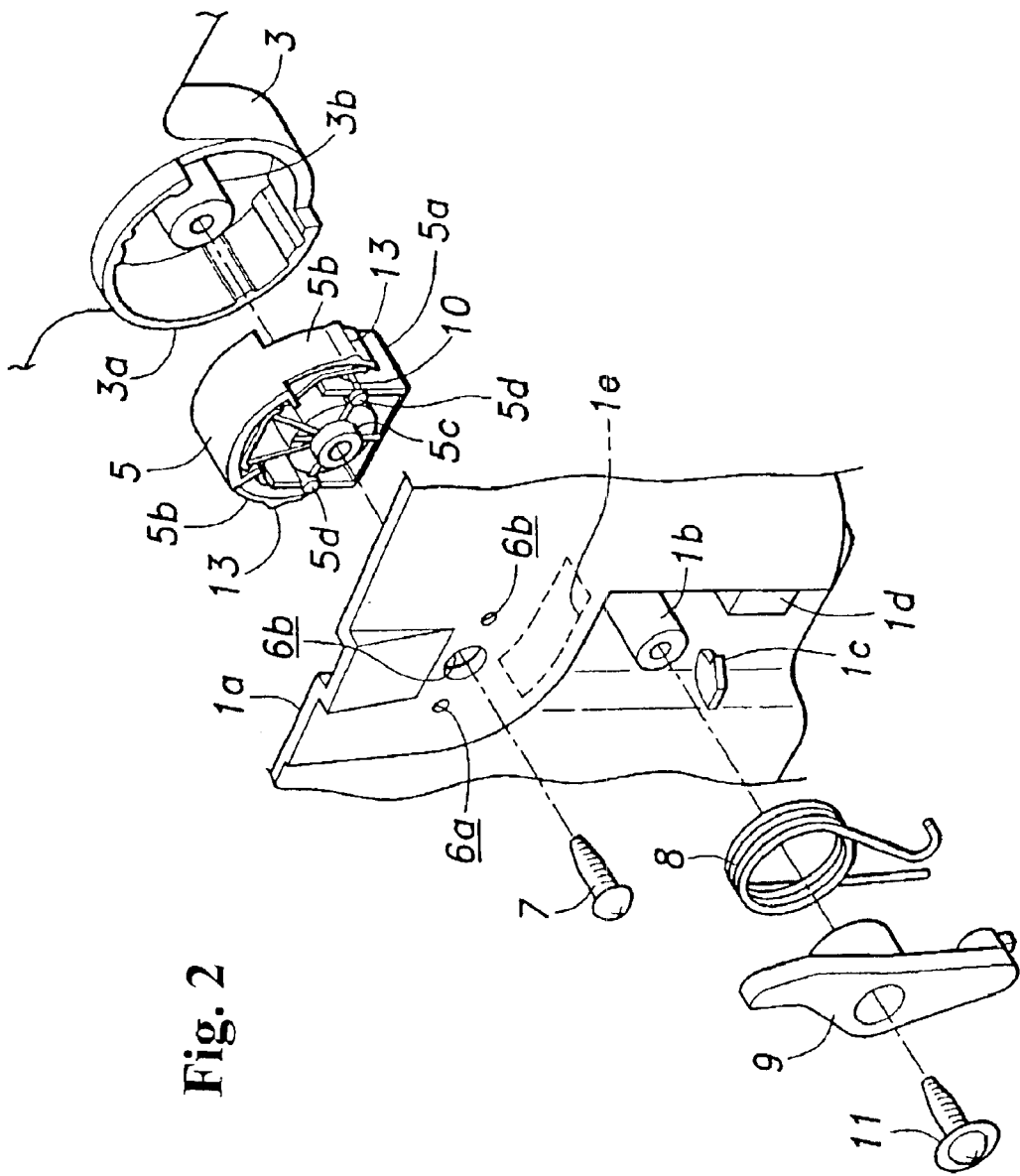
FIG. 2 is an exploded perspective view showing a pivot part of the small article compartment and the vicinity thereof.

Next, a structure of the pivotal support part between the main body 1 and the lid body 2 according to the present invention will be explained below with reference to FIG. 2. The protruding piece 3 provided integrally with the lid body 2 is arranged to be positioned inside a sidewall 1a of the main body 1, and is formed in a cylindrical shape with an opening bottom on a side of the sidewall 1a as shown in FIG. 2. A cam body 5 is received inside the cylindrical part 3a of the protruding piece 3.

The cam body 5 is formed in a shape having a rectangular main body part 5a and a pair of arc-shaped pieces 5b extending outward symmetrically to the left and right from an upper part of the main body part 5a. An outer surface is formed in a continuous surface by an upper part of the main body part 5a and the pair of the arc-shaped pieces 5b, and is formed in a semicircular shape along an inner perimeter surface of the cylindrical part 3a. In addition, a plate spring 10 for urging the pair of the arc-shaped pieces 5b radially outward is built into the main body part 5a. Also, three bumps 5c and 5d having different sizes are provided on a surface of the main body part 5a facing the sidewall 1a, and three corresponding positioning holes 6a and 6b having different sizes are provided on the sidewall 1a. The bumps 5c and 5d engage the positioning holes 6a and 6b, respectively, to define a position of the cam body 5 with respect to the sidewall 1a.

Also, a boss-shaped pivot shaft 3b is disposed to project outward coaxially on the bottom part of the cylindrical part 3a of the protruding piece 3, and a pivot shaft hole is provided on the main body part 5a of the cam body 5 for engaging the pivot shaft 3b. Also, a screw 7 fixes the cam body 5 positioned on the sidewall 1a, and the cam body 5 pivotally supports the protruding piece 3 via the pivot shaft 3b. Thus, the lid body 2 is pivotally supported on the main body 1 to tilt freely. A width between the two sidewalls 1a is set roughly equal to a width between the outmost ends of the two protruding pieces 3 (cylindrical parts with bottoms) of the lid body 2, and the lid body 2 does not come off from the main body 1 in the above assembled state.

Also, a shaft part 1b is provided to project outward on the outside of the sidewall 1a. A torsion coil spring 8 is fitted with play on the shaft part 1b to pivotally support a swivel arm 9 at a middle thereof. The torsion coil spring 8 and the swivel arm 9 are fixed by a screw 11 in the shaft part 1b. As shown in FIG. 1, one end of the torsion coil spring 8 engages a lower end of the swivel arm 9, and the other end thereof engages an engaging piece 1c on a side of the sidewall 1a, thereby urging the swivel arm 9 toward an arrow B direction shown in the drawing. The swivel arm 9 is provided on the outside of the main body 1, and the protruding piece 3 is provided on the inside thereof. An opening 1e is provided on one part of the main body 1 as shown in FIG. 2, so that one end of the swivel arm 9 forming a hook shape engages the lower part of the cylindrical part 3a.

Figure 3:
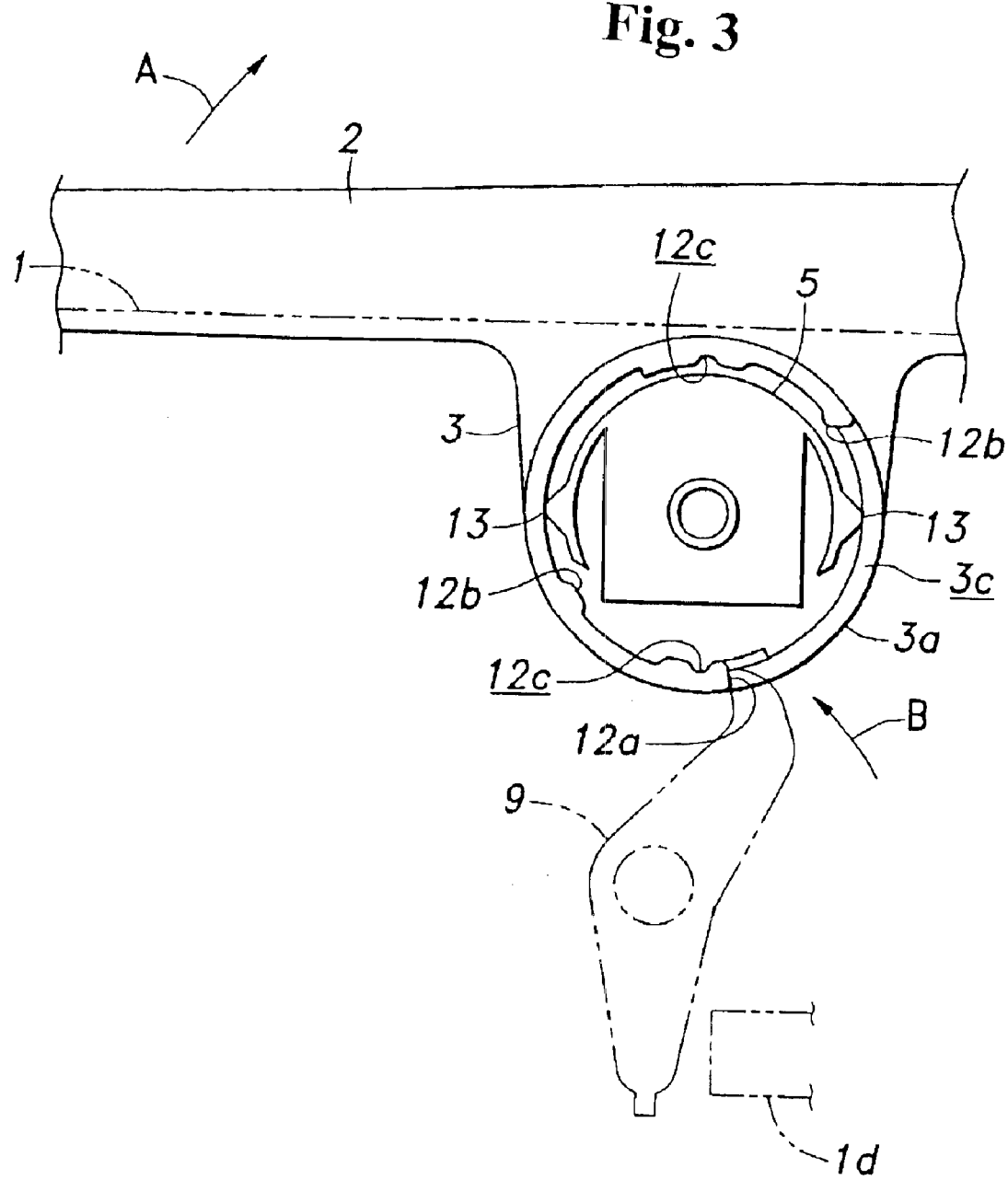
FIG. 3 is an enlarged side view of essential components in a state that a lid body is completely closed.

Next, an operation of opening and closing the lid body 2 of the small article compartment with a lid constituted in this manner is explained below. First, in the completely closed state, the cylindrical part 3a as the ring-shaped part and the swivel arm 9 are positioned as shown in FIG. 3 with respect to the cam body 5. That is, an engaging member 12a is provided at a suitable place on the perimeter wall part of the cylindrical part 3a around the pivot shaft of the protruding piece 3 constituting the pivotal support part, such that one end of the swivel arm 9 forming a hook shape engages the engaging member 12a in the circumferential direction. In order to avoid interference between the perimeter wall part of the cylindrical part 3a and the one end of the swivel arm 9 when the lid body 2 opens toward the arrow A direction shown in FIG. 3, a cut-out part 3c is provided by removing one part of the perimeter wall part of the cylindrical part 3a in a specified angular range (for example about 90 degrees) from the engaging member 12a.

Figure 4:
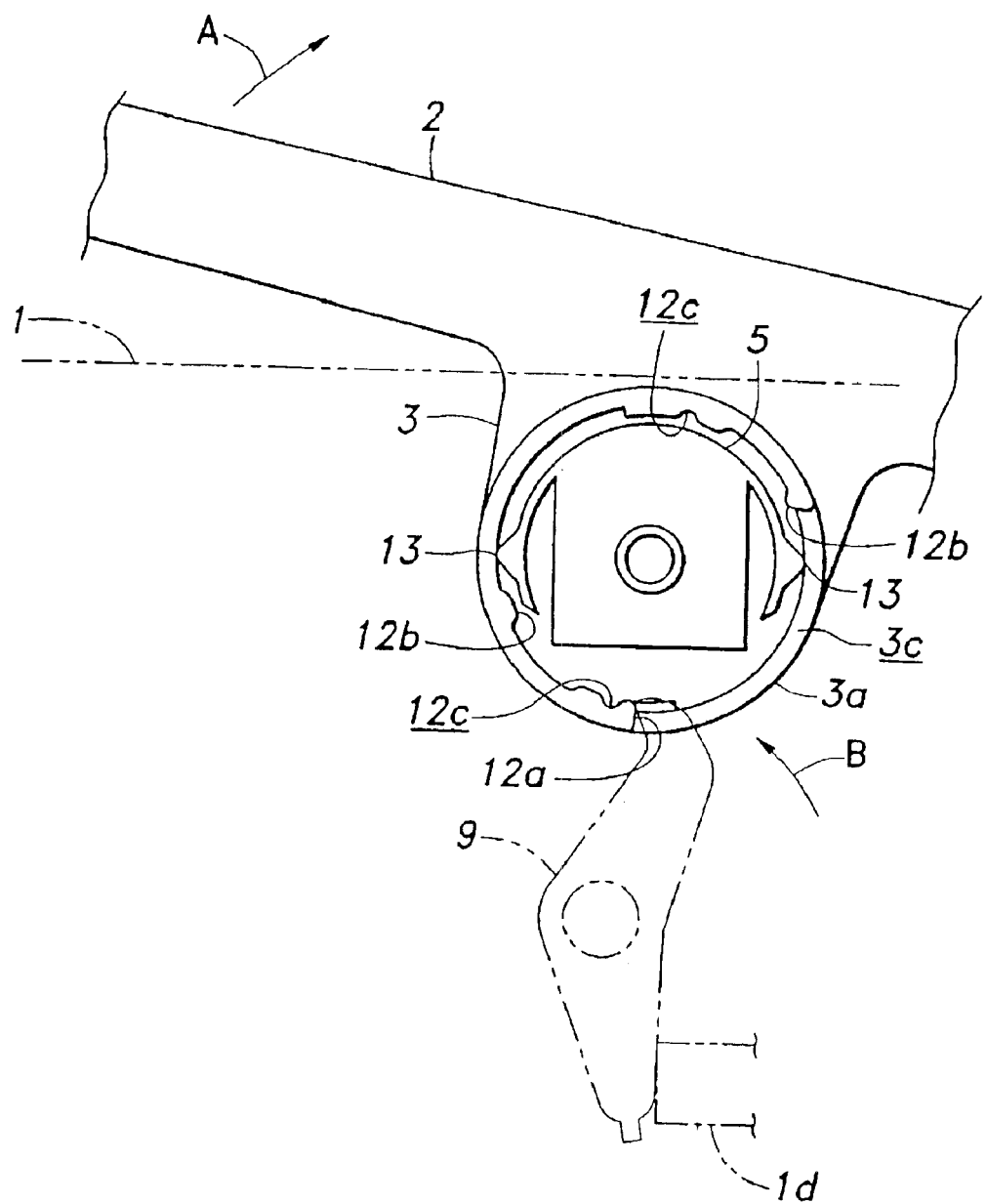
FIG. 4 is an enlarged side view of the essential components in a state that the lid body opens at an initial opening position.

In the above completely closed state in FIG. 3, the lid body 2 is held by the locking means (4a and 4b) against the force transmitted to the engaging member 12a via the swivel arm 9 urging toward the arrow B direction in the drawing. By releasing the engagement between the latch 4a and the engaging member 4b, for example, by pressing a push button associated with the latch 4a, the lid body 2 becomes in a somewhat opened state as shown in FIG. 4 by the force applied to the engaging member 12a. At this time, the other end (lower end in the drawing) of the swivel arm 9 collides with a stopper part 1d provided on the sidewall 1a. Accordingly, the swivel arm 9 rotates up to the colliding position, and the initial opening of the lid body 2 is restricted according to the position. Thus, by changing a design such as the shape of the swivel arm 9 and the colliding position of the stopper part 1d, a degree of the initial opening of the lid body 2 can be adjusted. For this purpose, the engaging range restricting means is provided.

Figure 5:
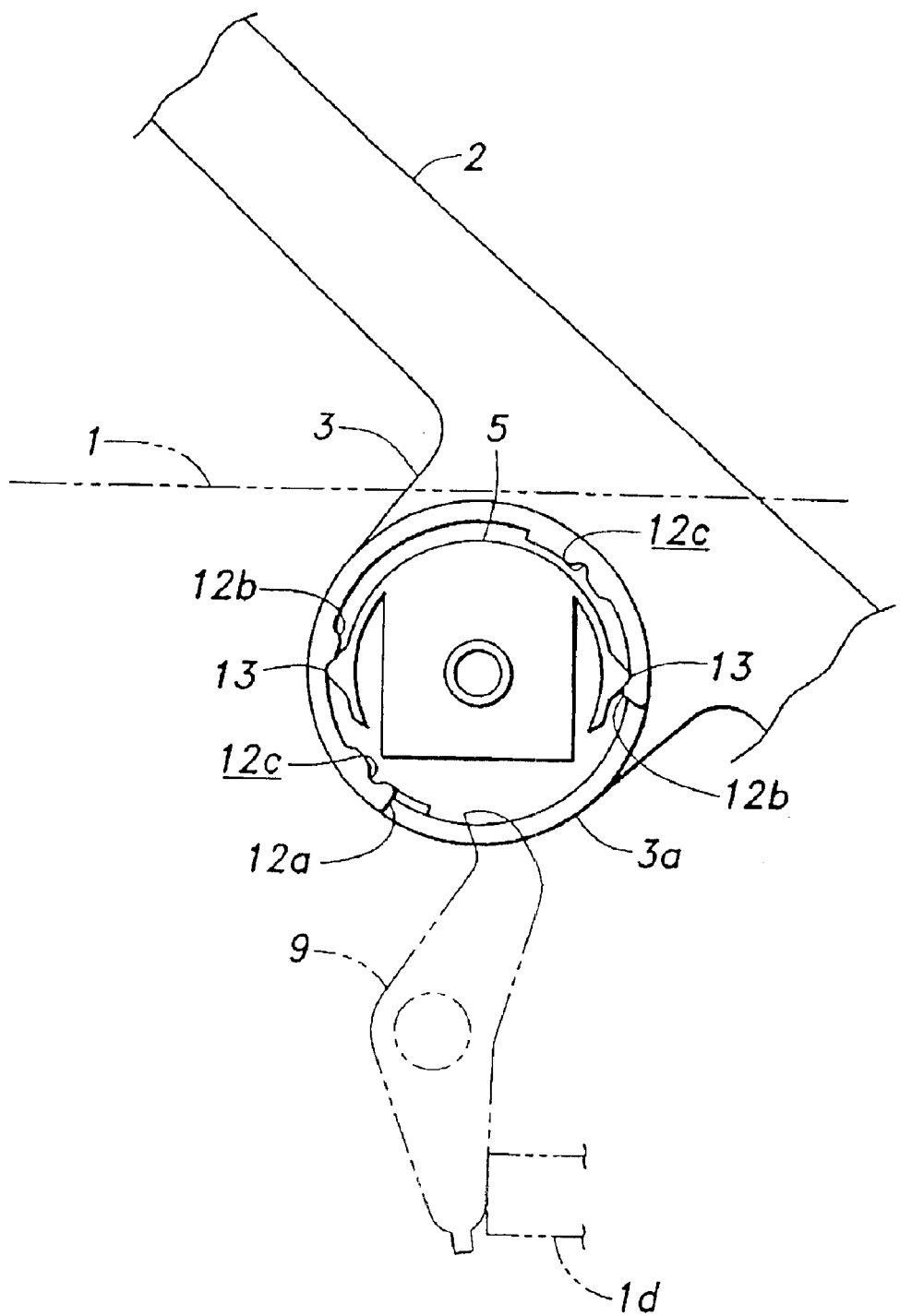
FIG. 5 is an enlarged side view of the essential components in a state that the lid body opens at a middle position.
Figure 6:
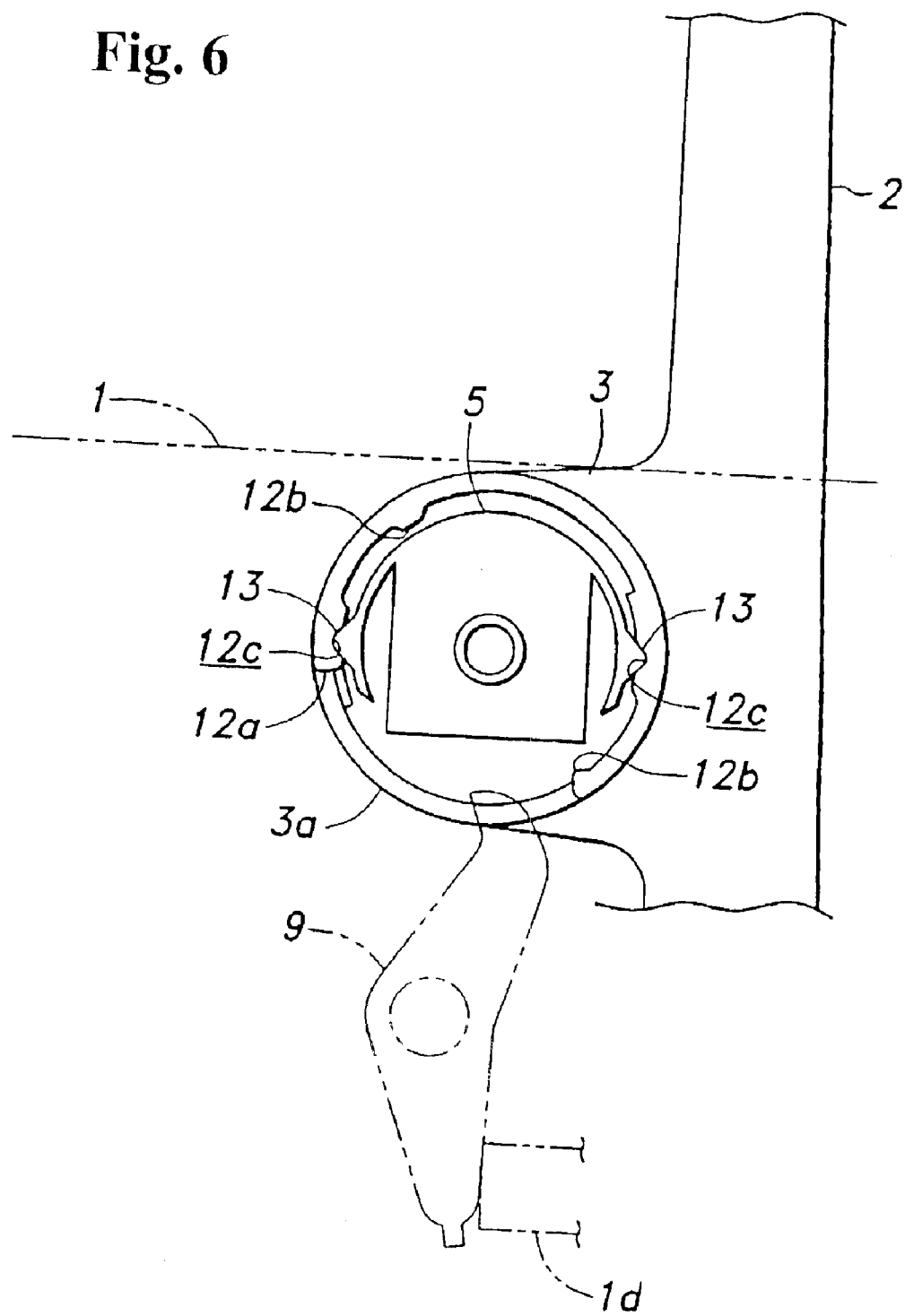
FIG. 6 is an enlarged side view of the essential components in a state that the lid body completely opens.
Figure 7:
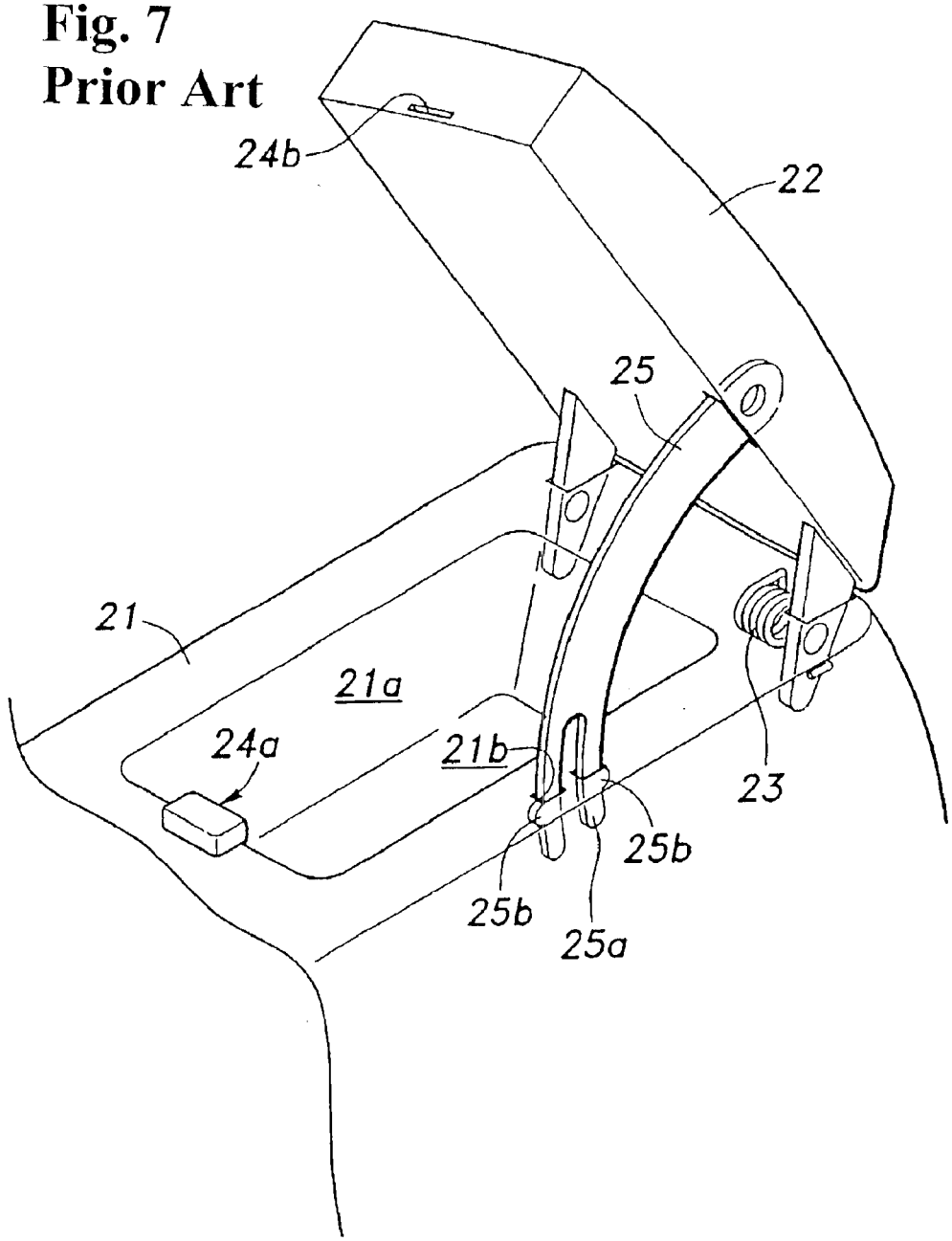
FIG. 7 is a perspective view showing a conventional small article compartment with a lid.

Also, the lid body 2 is further opened in order to place and remove a small article inside the main body 1. According to the present invention, the lid body 2 can, be held at an arbitrarily opening position. For this purpose, a pair of engaging convexes 12b is provided at symmetrical positions relative to the axis on the inner perimeter surface of the cylindrical part 3a. Also, engaging hooks 13 as concaves are provided on the respective extending ends of the pair of the arc-shaped pieces 5b of the cam body 5 as elastic engaging pieces. The engaging convexes 12b are provided in positions to engage the engaging hooks 13 in the closing direction of the lid body 2 as shown in FIG. 5. Thus, the engaging hooks 13 can move over the convexes due to the elastic deformation of the arc-shaped pieces 5b when the lid body 2 is opened about 45 degrees. Also, the lid body 2 does not close naturally from that opening state of about 45 degrees. With this configuration, the lid body 2 can be held at an opening position of about 45 degrees, and it is convenient in case that the lid is not required to be fully opened to place and remove a small article.

Furthermore, in the present embodiment, the lid body 2 can be held at an opening position of about 90 degrees. Thus, the engaging hooks 13 can move over the convexes due to the elastic deformation of the arc-shaped pieces 5b when the lid body 2 is opened about 90 degrees. Also, a pair of engaging convexes 12c engaging the engaging hooks 13 at the opening position of about 90 degrees is provided in symmetrical positions relative to the axis on the inner perimeter surface of the cylindrical body 3a. With this configuration, the lid body 2 can be held at an opening position of about 90 degrees, and the lid body 2 does not tilt naturally in either of the opening or closing directions from that state. Thus, it is convenient in a case of opening the lid body 2 widely to place and remove a small article. The shapes of each convex and concave are arbitrary, and they also may be reversed from the illustrated example.

As described above, when the lid is kicked out to an initial opening position from the completely closed state, the mechanism provided at the pivotal support part (protruding piece 3) of the lid body 2 and the vicinity thereof holds the lid in the initial opening position. Therefore, there is no obtrusive arc-shaped arm between the main body 1 and the lid body 2 as in the conventional example, and placing and removal of small articles and the like, are easy. Also, when the lid is opened to about 45 degrees and about 90 degrees, because the engaging hooks 13 engage the engaging concaves 12b and the engaging convexes 12c by the elastic returning force of the arc-shaped piece 5b, the lid body 2 can be opened with a clicking feeling, and the convenience of use is good. The opening position is not limited to that in the example, and the opening position of the lid body 2 can be arbitrarily set. Also, the lid may be held at multiple opening stages by stopping at several more positions.

Also, in the case of closing the lid body 2 from each opening position, since the engaging hooks 13 can move past the respective engaging concaves 12b and engaging convexes 12c by the elastic deformation of the arc-shaped piece 5b, it can be closed with little force. Also, when the lid body 2 is completely closed, the latch 4a can engage the engaging convex 4b in that position to hold the lid in the completely closed state.

According to the present invention, the initial opening position of the lid body can be restricted by the engagement between the engaging member and the spring forcing means. Since the engaging member is provided on the perimeter around the axis of the pivotal support part, the mechanism for restricting the initial opening of the lid body can be provided in the vicinity of the pivotal support part. Since there is no obstacle between the main body and the lid body when the lid is opened, placing and removing a small object, and the like, can be performed easily and the appearance also is improved. In particular, with the simple mechanism in which the engaging range of the swivel arm is restricted by a combination of the spring means and the swivel arm, the range of the initial opening can be restricted, and the apparatus can be made inexpensive.

Also, by providing the spring engaging means for holding the lid body at the initial opening position, because the lid body can be opened at a specific position with a clicking feeling and can be held at the initial opening position, the convenience of use is good. Also, by providing the concave or convex shaped part on the inner perimeter surface of the ring-shaped part, and providing the spring engaging piece engaging the concave or convex shaped part, the lid can be held in the initial opening position, which can be set arbitrarily or in multiple stages, thereby setting easily an opening position according to the convenience of use.

While the invention has been explained with reference to the specific embodiments of the invention, the explanation is illustrative and the invention is limited only by the appended claims.

What is claimed is:

1. A lid opening device, comprising:
a main body having an opening,
a lid body for opening and closing the opening of the main body,
a pivotal support part integrally formed on one end of the lid body and pivotally supported on the main body,
an engaging member provided on a perimeter of the pivotal support part of the lid body,
spring means attached to the main body for urging the engaging member of the lid body toward an opening direction thereof, said spring means having a spring supported on the main body, and a swivel arm provided on the main body to swivel freely and urged by the spring, said swivel arm having one end contacting the engaging member of the lid body and being urged by the spring toward the opening direction of the lid,
locking means formed between the lid body and the main body for holding the lid body in a closed position against an urging force of the spring means, and
engaging range restricting means formed on the main body for restricting a range of engagement between the spring means and the engaging member of the pivotal support part so that the lid body is opened by the urging force of the spring means to a predetermined initial opening position.

2. A lid opening device, comprising:
a main body having an opening,
a lid body for opening and closing the opening of the main body,
a pivotal support part integrally formed on one end of the lid body and pivotally supported on the main body,
an engaging member provided on a perimeter of the pivotal support part of the lid body,
spring means attached to the main body for urging the engaging member of the lid body toward an opening direction thereof,
locking means formed between the lid body and the main body for holding the lid body in a closed position against an urging force of the spring means,
engaging range restricting means formed on the main body for restricting a range of engagement between the spring means and the engaging member of the pivotal support part so that the lid body is opened by the urging force of the spring means to a predetermined initial opening position, and
elastic engaging means disposed between the lid body and the main body for elastically engaging the lid body at a position where the lid body is opened to a predetermined opening position so that the lid body is held at the predetermined opening position beyond the predetermined initial opening position.

3. A lid opening device according to claim 2, wherein said elastic engaging means includes a ring-shaped part provided coaxially with the pivotal support part, one of concave and convex shaped parts provided on an inner perimeter surface of the ring-shaped part, and a spring engaging piece fixed to the main body for elastically engaging the one of the concave and convex shaped parts in a state in which the spring engaging piece is located inside the ring-shaped part.

4. A lid opening device according to claim 3, further comprising a cam body attached to the main body and having arc-shaped pieces operating as the spring engaging piece, each of said arc-shaped pieces having elasticity and a projection engaging the one of the concave and convex shaped parts.

5. A lid opening device according to claim 4, wherein said ring-shaped part projects outwardly from the lid body to have the pivotal support part therein, a part of the ring-shaped part forming the engaging member.

6. A lid opening device, comprising:

a main body having an opening, a lid body for opening and closing the opening of the main body, a pivotal support part integrally formed on one end of the lid body and pivotally supported on the main body, an engaging member provided on a perimeter of the pivotal support part of the lid body, spring means attached to the main body, said spring means contacting the engaging member of the lid body and pivotally urging the lid body toward an opening direction thereof, locking means formed between the lid body and the main body for holding the lid body in a closed position against an urging force of the spring means, and engaging range restricting means formed on the main body adjacent to the spring means for restricting a range of engagement between the spring means and the engaging member of the pivotal support part so that the lid body in a closed condition is opened by the urging force of the spring means to a predetermined initial opening position where the spring means is stopped by the engaging range restricting means while allowing a further movement of the lid body beyond the predetermined initial opening position.

7. A lid opening device according to claim 6, wherein said spring means comprises a spring supported on the main body, and a swivel arm provided on the main body to swivel freely and urged by the spring, said swivel arm having one end contacting the engaging member of the lid body and being urged by the spring means toward the opening direction of the lid.

8. A lid opening device according to claim 7, further comprising elastic engaging means disposed between the lid body and the main body for elastically engaging the lid body at a position where the lid body is opened to a predetermined opening position so that the lid body is held at the predetermined opening position beyond the predetermined initial opening position.

9. A lid opening device according to claim 8, wherein said elastic engaging means includes a ring-shaped part provided coaxially with the pivotal support part, one of concave and convex shaped parts provided on an inner perimeter surface of the ring-shaped part, and a spring engaging piece fixed to the main body for elastically engaging the one of the concave and convex shaped parts in a state in which the spring engaging piece is located inside the ring-shaped part.

* * * * *